United States Patent [19]
Drayton

[11] 3,741,599
[45] June 26, 1973

[54] GRAB HOOK
[75] Inventor: Walker E. Drayton, York, Pa.
[73] Assignee: American Chain & Cable Company Inc., New York, N.Y.
[22] Filed: June 30, 1970
[21] Appl. No.: 51,069

[52] U.S. Cl. .............................. 294/82, 24/230.5 R
[51] Int. Cl. ............................................. B64d 17/38
[58] Field of Search.................. 294/82; 24/230.5 R

[56] References Cited
UNITED STATES PATENTS
3,268,967  8/1966  Jordan................................ 294/82

Primary Examiner—Harvey C. Hornsby
Attorney—Pennie, Edmonds, Morton, Taylor & Adams

[57] ABSTRACT

An improved grab hook for use with a chain, the grab hook having seating surfaces for suspending the link of the chain disposed within the throat of the hook in spaced relation with respect to the hook.

17 Claims, 4 Drawing Figures

3,741,599

GRAB HOOK

BACKGROUND OF THE INVENTION

Conventionally constructed grab hooks are generally U-shape in configuration. The U-shape configuration is defined by a shank portion, a spaced prong portion and a bridging portion connecting the shank and prong portions together. The shank and prong portions form the legs of the U and the bridging portion forms the bottom while the spacing between the shank and prong portions defines a throat through which the chain is adapted to be positioned.

Grab hooks are typically used with chains for lifting or hoisting loads or for tying down loads. In practice, the grab hook may be attached at the upper end of the shank portion to one end of a chain, the other end of which is connected to a suitable lifting or hoisting mechanism. The end of the chain with the hook may then be wrapped around underneath a load to be lifted and the grab hook hooked back onto the chain. In another application, the grab hook attached to one end of a chain of a lifting mechanism may be used to lift loads held by a separate chain. Here, the grab hook is simply hooked onto the other chain at some point intermediate its ends. This other chain may be one which is wrapped about the load to be lifted or may be one having the load attached at one end with the other end free. Where the grab hook is used for tying down loads, it may be connected to one end of a chain which is secured at its other end to the carrier. This chain can then be wrapped about the load and the hook hooked back onto the same chain or onto a separate chain secured to the carrier.

In any of the uses of the grab hook as explained above, the grab hook grabs the chain in such a way that it is prevented from sliding along the links. In particular, the throat of the grab hook is large enough to receive one link of the chain in an upright orientation but small enough to prevent entrance of the horizontally-oriented adjacent links on either side of the upright link. The upright link which is disposed within the throat of the hook rests on the bridging portion at the lower end of the throat.

With presently constructed grab hooks, the chain when placed under loaded conditions is subjected to combined stresses which may cause breaking of the chain. One of the stresses to which the chain is subjected is a tensile stress acting in a direction along the length of the chain. Since chains are constructed for taking these stresses, this presents no problem. Due, however, to seating of the upright link in the throat of the grab hook on the lower bridging portion thereof, the loading of the chain also creates a shearing or cutting force on this upright link. This shearing force which acts transversely of the link is not one which the chain is particularly suited for taking. Accordingly, when a chain is used in conjunction with a grab hook, the shearing stress on the upright link within the throat of the hook reduces the breaking strength of the chain.

In view of the strength limitations of chains when used with grab hooks of conventional construction, the useful or safe working loads of the chain are effectively reduced. For this reason and because of safety codes requiring that the loading of the chain be maintained with a prescribed factor of safety, it is often necessary to use larger chains and hooks to lift the desired load. This, in turn, causes increased expense and also inconvenience to the users of chain and cable hook assemblies.

SUMMARY OF THE INVENTION

In accordance with the teachings of the present invention, an improved grab hook is provided in which the chain is held within the hook in such a way that it is subjected only to straight tensile loading. In construction, the improved grab hook includes surfaces on either side of the hook which are adapted to engage and support the adjacent links on either side of the link which is disposed in an upright orientation within the throat of the hook. The adjacent links are supported at a level above the bottom of the throat so as to maintain the upright link spaced above the bridging portion of the hook and completely floating within the throat. With this construction, loading of the chain creates no shearing stresses in the upright link and the chain can withstand loads up to those required to break the chain under straight tensile loading.

In addition to the increased strength of the chain-hook assembly as created by eliminating shearing stresses on any of the links of the chain, applicant's invention also provides an added safety advantage where the chain is subjected to loads which cause elongation and deformation of the links of the chain and in particular the upright link disposed within the throat of the hook. Elongation of the upright link increases the spacing between the adjacent links on either side and this tends to upset the seating orientation of these links and thus permit downward movement of the upright link into engagement with the bridging portion of the hook. With the improved grab hook, such movement is restrained by the particular contour of the seating surfaces of the hook which surfaces function to reestablish the seating orientation of the adjacent links and maintain the upright link floating within the throat of the hook.

DESCRIPTION OF THE PREFERRED EMBODIMENTS

Figure 1:
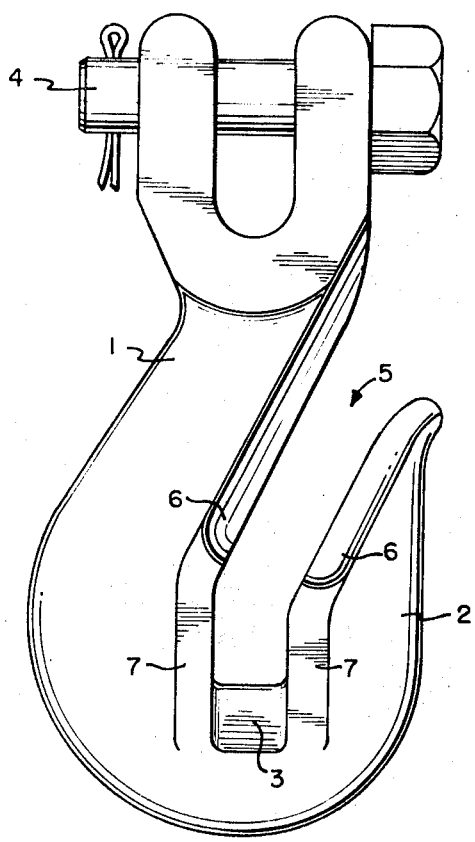
FIG. 1 is a side elevation of the improved grab hook constructed in accordance with the teachings of the present invention.
Figure 2:
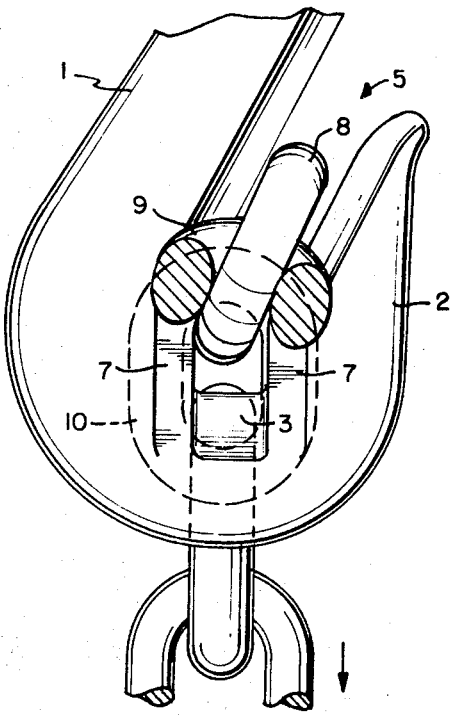
FIG. 2 is a side elevation of the improved grab hook showing a chain in place within the throat of the hook.
Figure 3:
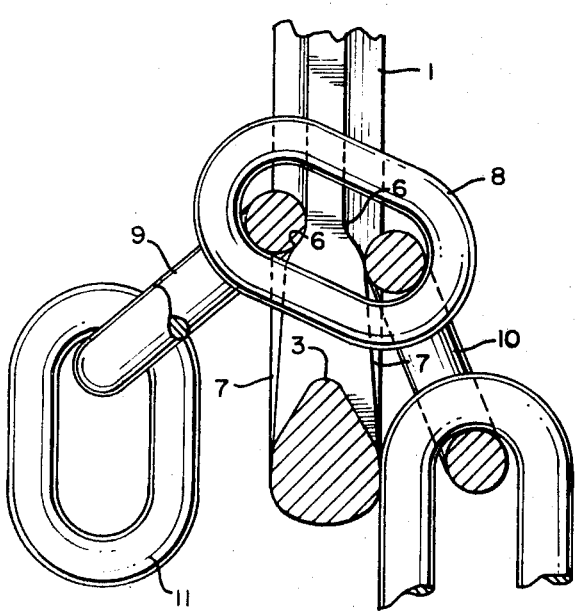
FIG. 3 is a cross-sectional view of the grab hook showing it being used in one type of lifting operation.
Figure 4:
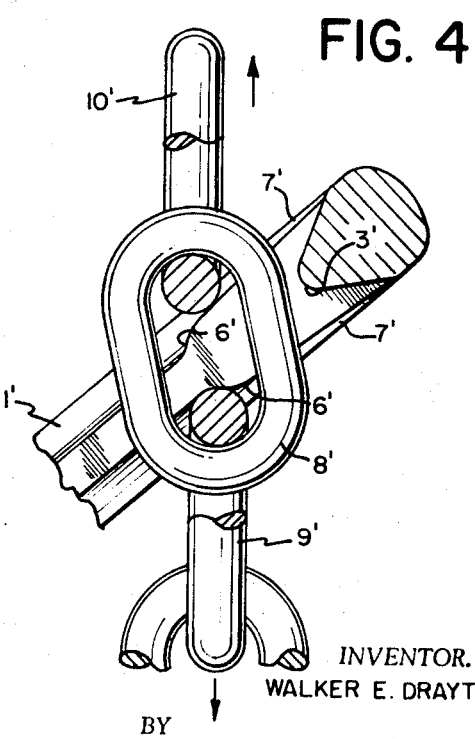
FIG. 4 is a cross-sectional view of the grab hook showing its use under different loading conditions.

With reference to the drawings, the improved grab hook includes a shank portion 1, a prong portion 2 and a bridging portion 3 connecting the shank and prong portions together at their lower ends. The upper end of the shank portion is adapted to receive a loading pin 4 by which the hook may be attached to a chain connected, for example, to a lifting or hoisting device. The lower end of the shank portion is spaced from the prong portion to define a throat 5 in which a chain is adapted to be held.

In accordance with the teachings of the present invention, the improved grab hook is provided with suspension means in the form of seating surfaces for supporting the adjacent links on either side of the link tion above the bridging portion of the hook such that there is no engagement between the upright link and said bridging portion when said chain is under load.

2. An improved grab hook according to claim 1 wherein:
   a. said suspension means is positioned on opposite sides of said hook for engaging the adjacent links on opposite sides of said upright link to restrain movement thereof toward the bridging portion of said hook.

3. An improved grab hook according to claim 2 wherein:
   a. said suspension means includes seating surfaces on either side of the hook for supporting said adjacent links.

4. An improved grab hook according to claim 3 wherein:
   a. the seating surfaces on opposite sides of the hook are spaced apart by a distance greater than the maximum spacing between the adjacent links of said chain as measured internally of said upright link.

5. An improved grab hook according to claim 4 wherein:
   a. said seating surfaces on opposite sides of said hook are disposed on opposite sides of said throat.

6. An improved grab hook according to claim 5 wherein:
   a. said seating surfaces are positioned on opposite sides of said hook for supporting the ends of the adjacent links disposed internally of said upright link.

7. An improved grab hook according to claim 6 wherein:
   a. each of said seating surfaces includes a side portion extending downwardly toward the bridging portion of said hook; and
   b. the spacing between the side portions on opposite sides of said hook is greater than said maximum spacing between the adjacent links at a height sufficiently above the bridging portion of said hook to restrain movement of said adjacent links toward said bridging portion and maintain said upright link spaced above said bridging portion.

8. An improved grab hook according to claim 7 wherein:
   a. the side portions on opposite sides of said hook diverge outwardly from each other in a direction toward the bridging portion of said hook.

9. An improved grab hook according to claim 6 wherein:
   a. the seating surfaces on opposite sides of said hook each include an upwardly facing portion, either one of which is adapted to engage in underlying relation with the end of one of said adjacent links disposed internally of said upright link.

10. An improved grab hook according to claim 16 wherein:
    a. each of the upwardly facing portions on opposite sides of said throat are spaced from each other to engage equally with the end of the adjacent link to maintain the upright link spaced from the sides of said throat.

11. An improved grab hook according to claim 9 wherein:
    a. the upwardly facing portions of the seating surfaces on opposite sides of said hook extend away from each other for a distance greater than said maximum spacing of the adjacent links of the chain.

12. An improved grab hook according to claim 11 wherein:
    a. each of the seating surfaces further includes a side portion extending downwardly from the upwardly facing portion thereof toward the bridging portion of said hook.

13. An improved grab hook according to claim 12 wherein:
    a. the minimum spacing between the upwardly facing portion of the seating surface on one side of said hook and the side portion of the seating surface on the other side of the hook is slightly less than said maximum spacing between said adjacent links.

14. An improved grab hook according to claim 13 wherein:
    a. said side portions on opposite sides of said hook are spaced from each other by a distance greater than said maximum spacing of said adjacent links.

15. An improved grab hook according to claim 17 wherein:
    a. each of the upwardly facing portions of the seating surfaces is generally complimentary in shape to the surface of the adjacent link engaged thereby; and
    b. each of the upwardly facing portions on opposite sides of said throat are spaced from each other to engage equally with the end of the adjacent link to maintain the upright link spaced from the sides of said throat.

16. In a grab hook and chain combination, wherein said grab hook has a general U-shape defined by a shank portion, a prong portion, and a bridging portion connecting the shank and prong portions together at their lower ends and in spaced relation to define a throat therebetween for receiving said chain passing therethrough with one link in an upright orientation in the throat, the improvement comprising:
    a. suspension means for supporting said chain passing through said throat with the upright link disposed within the throat, said suspension means including seating surfaces positioned on opposte sides of said hook and on opposite sides of said throat for supporting the ends of the adjacent links disposed internally of and on opposite sides of said upright link to support the upright link in spaced relation above the bridging portion of the hook, said seating surfaces on opposite sides of said hook being spaced apart by a distance greater than the maximum spacing between the adjacent links of said chain as measured internally of said upright link, and each of the seating surfaces on opposite sides of said hook including:
       1. an upwardly facing portion generally complementary in shape to the surface of the adjacent link engaged thereby, either one of which is adapted to engage in underlying relation with said end of one of the adjacent links.

17. In a grab hook having a general U-shape defined by a shank portion, a prong portion, and a bridging portion connecting the shank and prong portions together at their lower ends and in spaced relation to define a throat therebetween for receiving a chain passing therethrough with one link in an upright orientation in the throat, the improvement comprising:

a. suspension means for supporting a chain passing through said throat with the upright link disposed within the throat, said suspension means including seating surfaces positioned on opposite sides of said hook and on opposite sides of said throat for supporting the ends of the adjacent links disposed internally of and on opposite sides of said upright link to support the upright link in spaced relation above the bridging portion of the hook, said seating surfaces on opposite sides of said hook being spaced apart by a distance greater than the maximum spacing between the adjacent links of said chain as measured internally of said upright link, and each of the seating surfaces on opposite sides of said hook including:
1. an upwardly facing portion, either one of which is adapted to engage in underlying relation with said end of one of the adjacent links and both of which extend away from each other for a distance greater than the maximum spacing of said adjacent links, and
2. a side portion extending downwardly from the upwardly facing portion at an angle thereto and diverging outwardly from the other side portion in a direction toward the bridging portion of the hook, the side portion on one side of said hook being spaced from the other by a distance greater than the maximum spacing of said adjacent links and being spaced from the upwardly facing portion of the seating surface on the other side of the hook by a distance which is slightly less than the maximum spacing between said adjacent links.

* * * * *

PATENTED JUN 26 1973 3,741,599

INVENTOR.
WALKER E. DRAYTON
BY
ATTORNEYS